United States Patent Office 3,053,796
Patented Sept. 11, 1962

3,053,796
POLYMERIZATION PRODUCTS OF UNSATURATED TRIAZINE DERIVATIVES
Gaetano F. D'Alelio, South Bend, Ind., assignor, by direct and mesne assignments, to Dal Mon Research Co., Cleveland, Ohio, a corporation of Delaware
No Drawing. Filed Sept. 30, 1958, Ser. No. 764,253
8 Claims. (Cl. 260—45.4)

This invention relates to new, heat-resistant, polymeric compositions obtained by polymerizing a mass comprising a monomer of the structure:

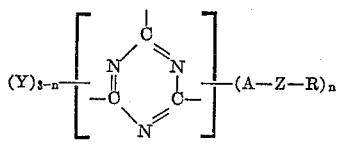

wherein $n$ is an integer having a value of at least 1 and no greater than 3; Z is a bivalent aromatic hydrocarbon radcial; R is an unsaturated hydrocarbon radical; A is a biradical selected from O and NR', in which R' is hydrogen or a hydrocarbon radical; and Y represents any monovalent radical.

Compounds of the above structure are referred to hereinafter as triazinyl vinyl compounds or triazine monomers.

For purposes of simplicity, the trivalent 1,3,5-triazine, or symmetrical triazine nucleus is represented by $C_3N_3$.

In the triazine monomers of this invention, Z is a divalent aromatic radical, predominantly hydrocarbon, having an aryl nucleus between said valencies including aralkyl, alkaryl, cycloaliphato-aryl radicals, which groups may have substituents such as chloro, fluoro, alkoxy, aryloxy, acyloxy, etc. groups. The unsaturated radical R is attached directly to one valency and is joined directly to the aryl nucleus. Illustrative examples of such divalent radicals include:

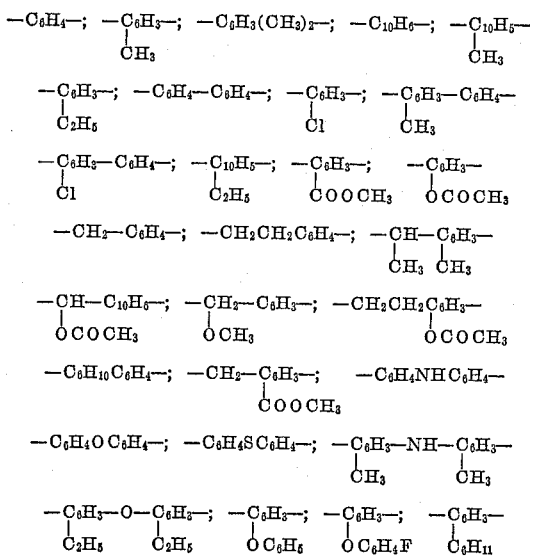

etc.

The substituent groups, such as the alkoxy, aryloxy, acyloxy, dialkylamino, diarylamino, etc. radicals, are advantageously radicals of no more than about ten carbon atoms, such as, methoxy, ethoxy, butoxy, pentoxy, octoxy, phenylmethoxy, phenylethoxy, acetoxy, propionoxy, butyroxy, valeroxy, capryloxy, benzoxy, phenylacetoxy, toluoxy, dimethylamino, diethylamino, dipropylamino, diphenylamino, dibenzylamino, etc. Other groups, such as nitroso, nitro, etc., can be used as substituents on the aryl groups provided they are inert during the preparation and use of the triazinyl vinyl monomer.

Also, without departing from the spirit of the invention, the carbon atoms in the divalent radical, Z, can be interrupted by an atom other than carbon, e.g.,

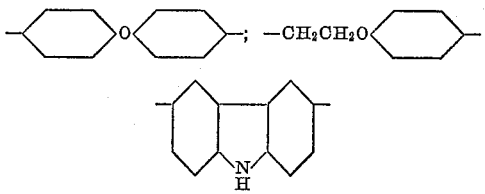

etc.

While other hydrocarbon and substituted hydrocarbon groups are also effective as Z groups, the groups indicated above are preferred for reasons of availability and economy.

The triazinyl vinyl compounds of this invention can be written as $(M)_n(C_3N_3)(Y)_{3-n}$ in which M represents the radical containing the polymerizable group, and the other symbols are as defined above. Where the monomer contains only one polymerizable group, soluble fusible polymers can be obtained. When the monomer contains two polymerizable groups, that is $(M)_n$ is $(M)_2$ and the remaining or third group is the same or different from the M group, insoluble, infusible polymers can be produced therefrom. When $(M)_n$ is $(M)_2$, insoluble, infusible polymers and copolymers can still be obtained where the Y group is any other polymerizable or non-polymerizable monovalent radical. For example, Y can be hydrogen and alkyl, aryl, aralkyl, alkaryl, cycloaliphatic and heterocyclic groups and their chloro, fluoro, alkoxy, aryloxy, acyloxy derivatives, such as methyl, ethyl, propyl, isopropyl, butyl, octyl, decyl, chloroethyl, fluoropropyl, cyclohexyl, cyclopentyl, phenyl, chlorophenyl, fluorophenyl, xenyl, naphthyl, tolyl, isopropyl phenyl, benzyl, phenethyl, phenyl propyl, acetoxy benzyl, ethoxy propyl, methyl naphthyl, vinyl, allyl, methallyl, allyl phenyl, etc., radicals; Y can also be hydroxyl and the alkoxy and aryloxy radicals derived from aliphatic, cycloaliphatic, aromatic and heterocyclic hydroxy compounds such as methyl alcohol, ethyl alcohol, isopropyl alcohol, butyl alcohol, isobutyl alcohol, decyl alcohol, phenol, the o-, m-, and p- cresols, the xylenols, naphthols, ethylene glycol, methyl glycol ether, butyl glycol ether, glycerine, penta erythritol, hydroxy naphthalene, hydroxy pyridine, as well as the alkoxy and aryloxy radicals of hydroxy acids and esters such as lactic acids, ethyl lactate, salicylic acid, methyl salicylate; and in addition Y can be an amino group, $NH_2$ or the radical of a mono- or di-substituted amino group, for example, the radicals derived from ethyl amine, methyl amine, butyl amine, nonyl amine, dimethyl amine, aniline, naphthyl amine, ethanol amine, diethanolamine, diisopropanol amine, methyl aniline, piperidine, amino pyridine, hydrazine, symmetrical dimethyl hydrazine, unsymmetrical dimethyl hydrazine, as well as the radicals of the amino-acids, amino-amides, amino-nitriles, specific examples of which are:

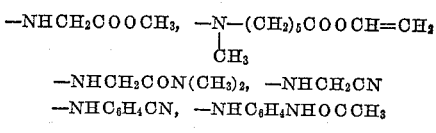

the radicals of semicarbazide and substituted semicarbazide and substituted semicarbazides, such as semicarbazide itself, 4-methyl semicarbazide, etc., as disclosed in my U.S. Patent No. 2,295,565, issued September 15, 1942; the quanazo radical which is attached to the triazine ring by reacting dicyandiamide with a hydrazino triazine as shown in my U.S. Patent No. 2,295,567, issued September 15, 1942; the radicals of urea and substituted ureas, such as —NHCONH$_2$, CH$_3$NHCONH—, etc., which may be attached to the triazine ring as shown in my U.S. Patent No. 2,312,688, issued March 2, 1943; radicals of aminoaryl sulphonamides, e.g. —NHC$_6$H$_4$SO$_2$NH$_2$,

—NHC$_6$H$_4$SO$_2$NHCH$_3$ etc. as shown in my U.S. Patent No. 2,312,697, issued March 2, 1943; radicals of acyl hydrazine and substituted hydrazines, such as CH$_3$CONHNH—,

C$_2$H$_5$CONHNC$_6$H$_5$—

C$_6$H$_5$SO$_2$NHNH$_2$, etc.; radicals of alkylene amines, such as

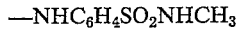

Y can also be the polymerizable radical of the acrylic, methacrylic, chloracrylic ester or amide of amine alcohols or dialcohols and diamines, e.g.,

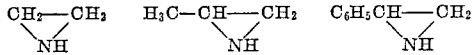

etc.; the radicals of polymerizable aminated or hydroxylated alkylene aryl compounds, for example,

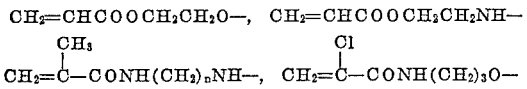

etc.; the radicals of malonic and substituted malonic esters, nitriles and amides, e.g.,

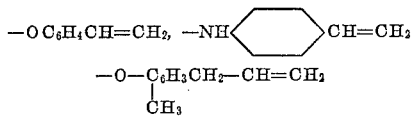

etc.; the

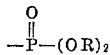

radical such as

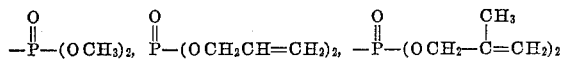

etc., or a triazine ring, e.g., (CH$_3$NH)$_2$C$_3$N$_3$—, or through a bridge, such as [(CH$_3$)$_2$N]$_2$(C$_3$N$_3$)NH—CH$_2$CH$_2$NH—, (C$_2$H$_5$NH)$_2$(C$_3$N$_3$)—OCH$_2$CH$_2$O—, (HO)$_2$(C$_3$N$_3$)NHCH$_2$CH$_2$O— etc., or the group can represent the remainder of the molecule, for example, (M)$_n$(C$_3$N$_3$)— in compounds of the structure (M)$_2$(C$_3$N$_3$)—(C$_3$N$_3$)(M)$_2$, as well as those structures linked together through carbon atoms, sulfuratoms, oxygenatoms, etc., as for example, (M)$_2$(C$_3$N$_3$)NHCH$_2$CH$_2$NH(C$_3$N$_3$)(M)$_2$
(M)$_2$(C$_3$N$_3$)NHCH$_2$CH$_2$O(C$_3$N$_3$)(M)$_2$
(M)$_2$(C$_3$N$_3$)OCH$_2$CH$_2$O(C$_3$N$_3$)(M)$_2$ etc.

Thus, it may be seen that a wide variety of modified polymerizable triazinyl vinyl compounds can be prepared in accordance with the practice of this invention and this modification is achieved by the nature of the Y radical, which can represent any monovalent radical.

When one of the groups attached to the triazinyl ring contains a polymerizable ethylenic group which is not inhibited by the other atoms and groups in the monomer, then a soluble, or fusible, or soluble-fusible polymer is obtained on polymerizing the monomer. Such monomers can also be copolymerized with other monovinyl or monovinylidene monomers, hereinafter generally referred to as vinyl monomers, such as acrylonitrile, methyl methacrylate, etc., to produce modified thermoplastic compositions. It has now been discovered that when two or more polymerizable groups are attached to the triazine ring, insoluble, infusible, heat resistant, and in many cases self-extinguishing polymerization products are obtained. It has been further discovered that the triazinyl-vinyl monomers of this invention can be copolymerized with other monoolefinic and polyolefinic monomers to produce new materials having insolubility, infusibility, and heat resistance and valuable and characteristic properties that make them especially suitable for use in industry, for example, in molding, laminating, casting, coating, and adhesive applications, and for other purposes.

In accordance with this invention, homopolymers of the triazinyl vinyl compounds can be produced as well as compositions of matter comprising an interpolymer (copolymer) or interpolymers of at least one triazinyl vinyl compound of this invention and at least one other polymerizable compound containing the structures or groupings, —CH=CH—, —CH=C<, or CH$_2$=C<. More particularly, it has been discovered that the triazinyl vinyl monomers of this invention are especially useful for the preparation of copolymers with unsaturated alkyd resins. As is well known, copolymers of the unsaturated alkyd resins, for example, copolymers of styrene and glycol maleate have wide utility in industry for the preparation of reinforced laminates, radomes, etc. However, such products, are limited in their applications by their poor resistance to heat, and are ineffective at relatively high temperatures. Many attempts have been made to improve the heat resistance of such compositions, but with limited success. Some improvement is achieved by the use of divinyl benzene, diallyl phthalate, and the like, instead of the styrene, but the degree of improvement is not commensurate with the added cost of such more expensive monomers. Furthermore, the use of such monomers does not improve the solvent resistance of the copolymer to aromatic hydrocarbons, or such active solvents as ketones and esters, nor do they reduce their combustibility, or produce copolymers which are self-extinguishing. Trialkyl cyanurate has been proposed for copolymers with unsaturated alkyd resins to produce materials that withstand temperatures in excess of 200° C. (Modern Plastics, vol. 29, No. 11, p. 116 (1952).) However, such copolymers cure very slowly require curing at 175°–200° F. followed by postcuring at 400°–500° F. for 24 hours, which requirements raise the costs of production and result in lower productivity. Furthermore, such compositions have numerous cracks and faults in their structure. (Modern Plastics, p. 153, October 1957.)

It has now been discovered that these problems can be eliminated by the use of the triazinyl vinyl monomers of this invention which together with the unsaturated alkyd give copolymerizable mixtures which have rapid rates of polymerization, together with high heat resistance, allowing such products to be used at relatively high temperatures.

Also, if solvent resistance is desired, this can be achieved by increasing the nitrogen content or the hydroxyl content in the monomer in the groups attached to the triazine ring, or if self-extinguishing properties are desired specifically, or in combination with heat resistance and solvent resistance, this can be accomplished by increasing the nitrogen content, or the halogen content, or the phosphorus content in the groups attached to the triazine ring. Thus, with the new triazinyl vinyl monomers of this invention, a host of new useful compositions can be prepared.

As indicated above, the monomers of this invention are particularly useful in the preparation of copolymers with unsaturated alkyd resins. In carrying this portion of the invention into effect, an esterification product of a polyhydric alcohol and an alpha, beta, unsaturated polycarboxylic acid is first prepared in accordance with techniques now well known to those skilled in the alkyd resin art. Any polyhydric alcohol containing at least two esterifiable aliphatic hydroxy groups, or mixtures of such alcohols, can be used in preparing the unsaturated alkyd resins. Examples of such polyhydric alcohols are ethylene glycol, di-, tri-, and tetra-ethylene glycols, thiodiglycol, glycerine, pentaerythritol, 1,4-dihydroxy butene-2, etc. Any alpha-unsaturated, alpha, beta-polycarboxylic acid, or mixtures of such acids, can be reacted with the polyhydric alcohol or alcohols to form the unsaturated alkyd resin. Examples of such polycarboxylic acids are maleic, monohalomaleic, fumaric, monohalofumaric, citraconic, mesaconic, acetylene dicarboxylic, aconitic, etc., itaconic and its homologues, as, for instance, alpha methyl itaconic acid, alpha,alpha-dimethyl itaconic acid, etc. Anhydrides of these polycarboxylic acids can also be employed.

In some cases, instead of using an unmodified alkyd resin, an unsaturated alkyd resin can be used which has been internally modified by replacing a part, say up to about 75 mole percent, of the unsaturated polycarboxylic acid with saturated aliphatic polycarboxylic acids, such as succinic, adipic, glutaric, pimelic, sebacic, azelaic, suberic, tricarballylic, etc., or with aromatic polycarboxylic acids, e.g., phthalic, benzoyl phthalic, terephthalic, benzophenone dicarboxylic, etc. Such acids also can be considered as being non-ethylenic polycarboxylic acids.

Anhydrides of these acids, if available, can also be used. The term "polycarboxylic acid" as used generally herein is intended to include within its meaning the anhydrides of the acids.

The esterification products of polyhydric alcohols with ethylenic polycarboxylic acids, or with ethylenic and non-ethylenic polycarboxylic acids, can be further modified by introducing as a reactant in the preparation of the alkyd resin, a non-esterifiable compound or compounds, more particularly a saturated or unsaturated normal or isomeric monohydric alcohol, or mixtures thereof, a saturated or unsaturated monocarboxylic acid, or mixture thereof, or both such esterifiable monohydroxy organic compounds, as well as by the use of hydroacids. Examples of monohydric alcohols which can be used as modifiers of the alkyd resin are propyl, isopropyl, butyl, isobutyl, amyl, isoamyl, hexyl, octyl, decyl, dodecyl, tetradecyl, cetyl, octadecyl, allyl, methallyl, 1-chlorallyl, 2-chlorally, crotyl, cinnamyl, 2-hydroxy-butene-1, etc. The use of methyl and ethyl alcohol is not precluded, but in general these alcohols are less satisfactory because of their lower boiling points. As monobasic acids can be used, for example, the unsubstituted saturated and unsaturated normal or isomeric monocarboxylic acids containing only one esterifiable group, such as acetic, propionic, butyric to stearic, inclusive, benzoyl, acrylic, methacrylic cinnamic, etc., acids of drying, semi-drying, and non-drying oils, e.g., the acids of tung oil, linseed oil, soya bean oil, castor oil, etc. The monoesterifiable compounds can be introduced into the esterification before, during, or after the esterification of the polyhydric alcohol with the polycarboxylic acid under conditions that interesterification of the monoesterifiable compound with the incompletely esterified polyhydric alcohol-polycarboxylic acid product is attained. That is, the monoesterifiable compound is introduced into the reaction mass before all of the acid groups of the polyhydric acid, or all of the alcohol groups of the polyhydric alcohol have been esterified.

The term "unsaturated alkyd resins," as used generally herein and in the appended claims, is intended to include within its meaning both unmodified esterification products of a polyhydric alcohol with alpha-unsaturated, alpha, beta-polycarboxylic acid and esterification products of these components which have been modified, for example, as briefly described hereinabove.

To achieve copolymerization of the unsaturated alkyd resin with the triazinyl monomers of this invention, a solution or mixture of the unsaturated alkyd resin in the triazinyl monomer preferably is first effected. Copolymerization of the components of the mixture is achieved rapidly and advantageously by the use of a small amount of a polymerization catalyst. Examples of polymerization catalysts which can be used are ozone, ozonides, inorganic super-oxides, such as barium peroxide, sodium peroxide, etc., aliphatic alkyl and acyl peroxides, e.g., butyl tertiary peroxide, acetyl peroxide, lauryl peroxide, stearyl peroxide, etc., peroxides of the aromatic acid series, e.g., benzoyl peroxide, phthalyl diperoxide, etc., various per-compounds, such as, perborates, persulfates, perchlorates, etc., aluminum salts, such as the halides, organic and inorganic acids, such as methacrylic acid, hydrofluoric acid, etc., metal compounds of the saturated and unsaturated acid, such as, for instance, cobalt and manganese resinates, linoleates, maleates, etc.; or mixtures of these catalysts. Any suitable amount of catalyst can be used but in general the catalyst concentration will be within the range of about 0.1 to about 4 percent by weight of the whole mass.

Copolymerization can also be effected by ionizing radiation, such as by atomic radiation from a reactor, or from Cobalt 60, or by means of high energy electron generated by electron linear accelerators. When rapidity of interpolymerization between the triazinyl monomer and the unsaturated alkyd resin is of secondary importance, copolymerization between these components can be effected merely under the influence of heat, light, or heat and light, and in the absence of an accelerator of polymerization. When light is used as a catalyst, a ketone, such as acetone, acetophenone, etc., can be added to accelerate the photopolymerization. The rate of the copolymerization and some of the properties of the final properties vary with the time, temperature, and, if a catalyst is used, also with the catalyst concentration. Copolymerization can be effected at or below room temperature, to temperatures above 100° C., for example, from about 130° C. to 150° C. or higher.

Typical examples of unsaturated alkyd resins are:

*Alkyd Resin A.—Ethylene Glycol Itaconate*

| | Parts (by weight) |
|---|---|
| Ethylene glycol | 23 |
| Itaconic acid | 52 |

The components are mixed and slowly heated in the course of one hour from room temperature to 190° C., in an inert nitrogen atmosphere, and held at this temperature for 3 to 5 hours.

*Alkyd Resin B.—Ethylene Glycol Maleate*

| | Parts |
|---|---|
| Ethylene glycol | 31 |
| Maleic anhydride | 32 |

The components are mixed and heated as in the preparation of alkyd resin A to 180° C., and held at that temperature for 4 to 6 hours.

*Alkyd Resin C.—Aectic Acid-Modified Diethylene Glycol Maleate*

| | Parts |
|---|---|
| Diethylene glycol | 106 |
| Maleic anhydride | 88 |
| Acetic anhydride | 10 |

The ingredients are mixed together and refluxed for 1 hour in an inert nitrogen atmosphere after which the reaction mixture is brought to 190° C., which temperature is maintained for 4 to 6 hours.

It will be understood, of course, that this invention is not limited to the use of the specific unsaturated alkyd resins mentioned above and that a broad modification of the nature of the copolymer is possible by using the various triazinyl monomers with other unsaturated alkyd resins or mixtures of such resins. As illustrative examples of other unsaturated alkyd resins, the following esterification products can be used.

| Alkyd Resin: | Components (parts) |
| --- | --- |
| D | Diethylene glycol (160). <br> Maleic anhydride (147). |
| E | Diethylene glycol (106). <br> Itaconic acid (130). |
| F | Glycerine (18.4). <br> Itaconic acid (39.0). |
| G | Glycerine (20). <br> Itaconic acid (29). <br> Phthalic anhydride (11). |
| H | Ethylene glycol (20). <br> Maleic anhydride (29.4). <br> Succinic acid (3.3). |
| I | Diethylene glycol (30.6). <br> Maleic anhydride (17.6). <br> Itaconic acid (15.6). |
| J | Diethylene glycol (30.3). <br> Maleic anhydride (13.2). <br> Phthalic anhydride (21.7). |

In many cases, instead of polymerizing a single triazinyl monomer with a single unsaturated alkyd resin, mixtures can be used of two or more triazinyl monomers with a single unsaturated alkyd resin, or a single triazinyl monomer with two or more unsaturated alkyd resins, or a mixture of two or more triazinyl monomers with two or more unsaturated alkyd resins. In conjunction with the alkyd resins, other monomers can be used which are copolymerizable with the triazinyl monomers or with the unsaturated alkyd resin, or with both, for example, one or more triazinyl monomers can be used with one or more unsaturated alkyd resins together with styrene. In addition to, or in lieu of the styrene, another monomer, or mixture of monomers can be used, for example, the vinyl esters, i.e., vinylacetate, and the vinyl esters of saturated and unsaturated, aliphatic and aromatic, monobasic and polybasic acids, more specifically the vinyl esters of the following acids: chloracetic, propionic, bromopropionic, isobutyric, valeric, caprylic, capric, oleic, stearic, acrylic, methacrylic, crotonic, oxalic, malonic, succinic, glutaric, adipic, suberic, azelaic, phthalic, terephthalic, benzoylphthalic, benzophenone-2,4' dicarboxylic acid, maleic, fumaric, itaconic, mesaconic, hexahydrobenzoic, citric, trimesic, etc., as well as the corresponding allyl, methallyl, chlorallyl, etc. esters of the aforementioned acids. Other suitable monomers are the acrylic and alkacrylic acids and their derivatives, such as their esters, amides and corresponding nitriles, for example, acrylic acid, methyl acrylate, butyl acrylate, allyl acrylate, ethylene glycol diacrylate, acrylonitrile, methacrylonitrile, methacrylic acid, methyl methacrylate, etc.; the itaconic acid monoesters and diesters, such as the methyl, ethyl, phenethyl, allyl, dimethallyl, the maleic and fumaric acid monoesters, diesters and their amide and nitrile compounds, such as, ethyl allyl maleate, fumaryl dinitrile, dimethallyl fumarate, etc.; the ethers, such as vinyl phenyl ether, methallyl allyl ether, vinyl allyl ether, vinyl methallyl ether, allyl crotyl ether, vinyl crotyl ether, hydroquinone divinyl ether, propargyl allyl ether, divinyl methyl glyceryl ether, etc.; the aryl ethylenes, such as p-methyl styrene, the o-, m-, and p-divinyl benzenes, vinyl naphthalene, diallyl naphthalene, dimethallyl carbazole, vinylpyridine, etc.; the polyolefins and their polymerizable derivatives, such as phenyl butadiene, chloroprene; low molecular weight polymers, such as the dimers, trimers, tetramers, etc. of butadiene, isoprene, etc.; cyanuric acid derivatives, such as diallyl cyanurate, triallyl cyanurate, trivinyl cyanurate, or in general, triazine compounds having at least one polymerizable or copolymerizable unsaturated group attached directly or indirectly to the triazine ring; as well as the partial, soluble or fusible polymers of the hereinabove listed monomers, etc.

The modified unsaturated alkyd resins of this invention can be used alone or with fillers, dyes, pigments, opacifiers, lubricants, plasticizers, natural and synthetic resins or other modifying bodies in, for example, casting, molding, laminating, coating applications, and as adhesives, impregnants, and protective coatings.

In coating, impregnating and similar applications, the mixed monomeric or partially copolymerized materials, without added solvent can be applied to the object to be treated and polymerized, with or without the application of heat and pressure, to form the final insoluble polymeric composition in situ. These new synthetic materials can be used as impregnants for many porous bodies, such as cork, pottery, felts, or fabricated bodies with interstices, such as the windings of electrical coils, netted fibers, interwoven fibrous cotton or glass materials, etc. They can also be used for the production of wire coatings and winding tapes, and for protectively coating impervious articles, such as metals, or for coating and impregnating articles such as paper, wood, cloth, glass fibers in felted, woven or other form, concrete, linoleum, synthetic boards, etc. These new synthetic materials can also be employed in making laminated fibrous sheet materials wherein superimposed layers of cloth, paper, glass fabrics or mats, etc., are firmly bonded together with these new compositions. Also, these new mixtures comprising at least one triazinyl monomer of this invention and at least one unsaturated alkyd resin, with or without modifying agents, can be cast or molded under heat or under heat and pressure. The solid and semi-liquid thermoplastic and thermosetting materials of this invention can also be molded by injection, extrusion, or compression molding techniques, or by contact or low-pressure methods, whereby they are converted into a variety of molded articles for industrial, household, and novelty uses.

In preparing the interpolymerization products of the unsaturated alkyd resin and the copolymerizable triazine monomer, the unsaturated alkyd resin can constitute as much as 98 or 99 percent by weight of the whole. In other cases the triazinyl monomer alone, or admixed with other monomers, can constitute as much as 98 to 99 percent by weight of the whole. In general, the proportions of the components used in a particular formulation will depend upon the particular properties desired in the interpolymer. For most applications, it is preferred to use 30 to 90 percent of the unsaturated alkyd resin and from 10 to 70 percent of the triazinyl monomer, since within these ranges interpolymers best adapted for most commercial applications can be produced. Within these ranges the new interpolymers have a wide range of properties. Depending, for example, upon the particular monomer or mixture of monomers used with the particular unsaturated alkyd resin, the particular proportions thereof, the conditions of polymerization, such as the temperature, time, pressure, presence or absence of catalyst, kind of catalyst used, if any, as well as the catalyst concentration, and the extent of polymerization, they can vary from soft flexible bodies to hard rigid masses of varying resistance to solvents. In the intermediate stages of copolymerization, some form fluid compositions of varying viscosities and may be so used. For coating or impregnating applications where the presence of a small amount of solvent in the cured composition is not objectionable, the mixed starting component can be diluted with volatile or non-volatile solvents or diluents best suited for the particular service application, and then can be polymerized after the application of the solution to the particular article to be coated or impregnated or impregnated and coated. By suitable selection of the starting material and the conditions of the interpolymerization, interpolymers can be obtained in an insoluble, infusible state practically resistant to the destructive effect of other chemical bodies, such as acid, bases, salts, solvents, swelling agents, and the like.

The triazinyl vinyl monomers of this invention are also useful in the preparation of a large number of homopolymers when a single triazinyl vinyl monomer is used, or copolymers of triazinyl vinyl monomers when more than one such monomer is used.

When it is desired to modify the properties of the polymers of the triazinyl vinyl monomers of this invention, this can be accomplished by copolymerizing a mixture comprising at least one triazinyl monomer with at least one copolymerizable unsaturated ethylenic, or acetylenic hydrocarbon radical, more particularly, a $CH_2=C<$ radical, such as vinyl, allyl, methallyl, vinylidene, etc., or with a copolymerizable compound containing a —CH=CH<, or a —CH=C<, or a >C=C< grouping, for example, as in vinylidene chloride, vinylidene cyanide, vinyl chloride, maleic anhydride, or its esters and amides, methyl maleic anhydride, tetrafluoroethylene, etc.

Additional examples of copolymerizable monomers are monomeric or partially polymerized styrene, the methyl styrenes, vinyl naphthalenes, vinyl esters, such as the acetate, bromide, fluoride, chloroacetate, propionate, etc.; vinyl ketones, methvinyl ketones, vinylidene halides, as the bromide, fluoride, etc., olefinic nitriles, such as acrylonitrile, methacrylonitrile, fumaryl nitrile, beta-cyano-ethyl acrylate, acrylic and methacrylic esters, e.g., methyl acrylate, ethyl acrylate, propyl acrylate, butyl acrylate, ethyl methacrylate, propyl methacrylate, butyl methacrylate, octyl methacrylate, glycol dimethacrylate, allyl methacrylate, etc.; itaconic esters, e.g., dimethyl itaconate, diethyl itaconate, diallyl itaconate; olefinic amides, e.g., acrylamide, itaconamide, the maleic mono- and di-amides, and the corresponding imides, etc.; the vinyl ethers, e.g., vinyl butyl ether, vinyl isobutyl ether, vinyl phenyl ether, the dienes, e.g., butadiene, isoprene, chloroprene, dimethyl butadiene, etc.

In preparing copolymers of the triazinyl vinyl monomers with other polymerizable monomers such as styrene, methyl methacrylate, acrylonitrile, vinylidene cyanide and the like, the triazinyl monomer can constitute as little as 0.1 percent by weight of the whole, whereas in other cases, the triazinyl monomer alone can constitute as much as 98 to 99 percent of the whole. As in the case of the copolymers with the unsaturated alkyd resin copolymers, the proportion of the components in a particular formulation will depend upon the particular monomers used and the particular properties desired in the copolymer. The polymers and copolymers can be preparde in mass casting processes, or in solution, or in suspension or emulsion processes, in the absence or presence of catalysts, such as mentioned hereinabove, including ionizing radiation.

The monomers of this invention can also be added to preformed polymers, such as polyacrylonitrile, polyethylene, polystyrene, cellulose acetate, polyvinyl acetate, and then polymerized while admixed with the polymer by added catalysts, or they may be grafted to the polymer by irradiation, such as ionizing radiation from a cobalt or radioactive source, such as ionizing radiation from a linear electron accelerator, etc.

The symbol R represents a terminally unsaturated hydrocarbon radical having a $CH_2=<$ grouping of the structure $$CH_2=CR''—(CR''_2)_m—$$

wherein $m$ is zero or 1, and $R''$ is hydrogen, halogen, or a hydrocarbon radical, e.g., typical examples of R include

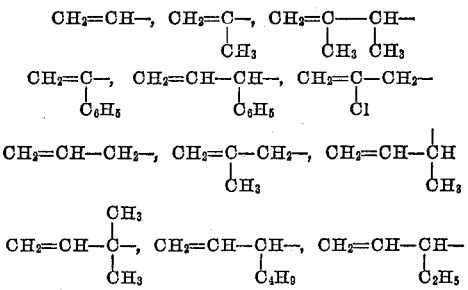

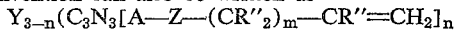

etc. Preferably, because of the ease of polymerizability, R'' is hydrogen, as for example, in $CH_2=CH—$ and $CH_2=CHCH_2—$.

In view of the above definition of R, the monomers of this invention can also be written as $$Y_{3-n}(C_3N_3[A—Z—(CR''_2)_m—CR''=CH_2]_n$$

wherein $m$ is 0 or 1, and $R''$ is hydrogen, halogen, or a hydrocarbon radical.

The symbol A represents a biradical selected from the class of oxygen and —NR'— in which R' is selected from the class consisting of hydrogen and hydrocarbon radicals, such as: alkyl, aryl, alkaryl, aralkyl, cycloaliphatic, heterocyclic radicals, etc., as well as their halogenated, acetoxy, alkoxy, aryloxy, alkaryloxy, aralkoxy, etc. substitution derivatives, e.g., phenethyl, methyl, ethyl, propyl, butyl, amyl, hexyl, octyl, dodecyl, ethoxyethyl, vinyl, allyl, crotyl, cyclohexyl, cyclohexenyl, phenyl, tolyl, benzyl, naphthyl, pyridyl, chlorophenyl, methoxy phenyl, pentachlorophenyl, acetoxynaphthyl, fluoronaphthyl, ethoxynaphthyl, butyroxyphenyl, etc.

For reasons of availability and economy, R' is preferably hydrogen, methyl, or ethyl.

Various methods can be employed to produce the triazinyl vinyl monomers of this invention. One method of preparing these new monomers comprises effecting reaction between a halogenated triazine and MH, wherein M is the radical containing the polymerizable group as indicated above, which reaction is represented as follows, in each case using a hydrohalide acceptor such as sodium hydroxide:

$$(C_3N_3)Cl_3+3MH \rightarrow (C_3N_3)(M)_3+3HCl$$

When it is desired to modify the monomer by the presence of a Y group, this can be accomplished by first introducing the M group and then introducing the Y groups, for example:

$$(C_3N_3)Cl_3+2MH \rightarrow (M)_2(C_3N_3)Cl+2HCl$$
$$(M)_2(C_3N_3)Cl+YH \rightarrow (M)_2(C_3N_3)Y+HCl$$

or if the Y group is already attached to the triazine ring, then the M group can be attached as for example:

$$(Y)(C_3N_3)Cl_2+2MH \rightarrow (M)_2(C_3N_3)(Y)$$

or the Y group can be introduced first, before introducing the M group, as for example, $$(C_3N_3)Cl_3+YH \rightarrow Y(C_3N_3)Cl_2+HCl$$

and $$Y(C_3N_3)Cl_2+2MH \rightarrow Y(C_3N_3)(M)_2+2HCl$$

The reaction can be generalized further by the equation $$(Y)_{3-n}(C_3N_3)(Cl)_n+nMH \rightarrow (Y)_{3-n}(C_3N_3)(M)_n$$

and in the above equations halogen derivatives other than the chloride can also be used, and $n$, M and Y have the same meaning given hereinabove. These reactions can be carried out in an anhydrous liquid medium such as ether, benzene, dioxane, acetone, etc., or in water, or in mixtures of water with water-soluble solvents such as acetone, dioxane preferably in the presence of an hydrohalide acceptor such as sodium hydroxide, potassium hydroxide, sodium bicarbonate, sodium carbonate, pyridine, tributyl amine, etc., and at temperatures from below or about room temperature to temperatures corresponding to the refluxing temperature of the solvent or mixture of reactants.

Illustrative examples of halogenated triazine intermediates that can be used in the preparation of triazine monomers include the following:

$(C_3N_3)Cl_3$, $(C_3N_3)Br_3$, $(C_3N_3)I_3$ $HO(C_3N_3)Cl_2$, $HO(C_3N_3)Br_2$, $H_2N(C_3N_3)Cl_2$ $(CH_3)_2N(C_3N_3)Cl_2$, $(C_2H_5)_2N(C_3N_3)Cl_2$ $CH_3O(C_3N_3)Cl_2$, $C_2H_5O(C_3N_3)Br_2$ $CH_2=CHCH_2O(C_3N_3)Cl_2$, $CH_2=CCH_2-O(C_3N_3)Cl_2$
$\qquad\qquad\qquad\qquad\qquad\quad |$
$\qquad\qquad\qquad\qquad\qquad\ \ CH_3$ $H(C_3N_3)Cl_2$, $C_2H_5(C_3N_3)Cl_2$ $C_6H_5(C_3N_3)Cl_2$, 
$\quad CH_2$
$\quad |\ \ \backslash$
$\qquad\ N(C_3N_3)Cl_2$
$\quad |\ \ /$
$\quad CH_2$ $CH_3CONHNH(C_3N_3)Cl_2$
$C_2H_5CONHCH_2CH_2NH(C_3N_3)Cl_2$
$C_3H_2COOCH_2CH_2O(C_3N_3)Cl_2$
$(CH_3O)_2PO(C_3N_3)Cl_2$
$(CH_2=CHCH_2O)PO(C_3N_3)Cl_2$
$ClC_6H_4NH(C_3N_3)Cl_2$
$CH_3OC_6H_4NH(C_3N_3)Cl_2$
$CH_3OOCC_6H_4(C_3N_3)Cl_2$
$H_3COOCCH_2NH(C_3N_3)Cl_2$
$H_2NO_2SC_6H_4NH(C_3N_3)Cl_2$
$CH\equiv CCH_2O(C_3N_3)Cl_2$
$(CH_3O)_2(C_3N_3)Cl$
$(CH_3HN)_2(C_3N_3)Cl$
$(C_6H_5)(HO)(C_3N_3)Br$
$[(CH_3O)_2PO]_2(C_3N_3)Cl$
$(ClC_6H_4NCH_3)_2(C_3N_3)I$
$CH_2=CHCH_2O)_2(C_3N_3)Cl$ Illustrative examples of the MH compounds that can be used as intermediates in the preparation of triazine monomers include:

$HOC_6H_4CH=CH_2$
$HOCH_2C_6H_4CH_2CH=CH_2$
$HOC_6H_4CH_2CH=CH_2$
$H_2NC_6H_4CH_2CH=CH_2$
$CH_3NHC_6H_4CH_2CH=CH_2$
$CH_2=CHCH_2NHC_6H_4CH_2CH=CH_2$
$H_2NC_6H_3(CH_3)(Ch_2CH=CH_2)$
$HOC_6H_3(CH_2CH=CH_2)_2$ $HOC_6H_4C_6H_4CHCH=CH_2$
$\qquad\qquad\qquad\quad |$
$\qquad\qquad\qquad\ \ CH_3$ $HOC_6H_4OC_6H_4CH_2C=CH_2$
$\qquad\qquad\qquad\qquad |$
$\qquad\qquad\qquad\ \ CH_3$ $HOC_6H_3(OC_6H_5)(CH_2CH=CH_2)$
$HOC_6H_4NHC_6H_4CH_2CH=CH_2$
$HOC_6H_{10}C_6H_4CH=CH_2$
$NH_2-C_6H_{10}C_6H_4CH_2CH=CH_2$ $HOC_6H_4-CH=CH_2$
$\qquad\quad\ |$
$\qquad\quad OOCCH_3$ etc.

Methods of preparing the intermediates used in preparing the monomers of this invention are known in the art.

This invention will be more fully described by the following examples. The invention is not to be regarded, however, as restricted in any way by these examples and they are to serve merely as illustrations. In these examples, as well as throughout the specification, "parts" and "percentages" shall mean parts by weight and percentages by weight unless specifically provided otherwise.

EXAMPLE I

Preparation of Triazine Monomers

To 40 parts of para allyl aniline and 12 parts of sodium hydroxide in 200 parts of water is added slowly and with stirring 18.5 parts of cyanuric chloride in 50 parts of acetone in a flask equipped with means for refluxing. Upon completion of the addition of the chloride, there is added one part of 2,6-ditertiary-butyl para-cresol and the mixture is refluxed for about 4.5 hours and allowed to cool to room temperature, after which the mixture is filtered to remove the solid monomer. The monomer is washed with water and recrystallized from acetone-water mixtures. There is obtained $(C_3N_3)NHC_6H_4CH_2CH=CH_2)_3$ Ultimate analyses for carbon, hydrogen, nitrogen, and molecular weight determinations give values of 75.92%, 6.32%, 17.63%, and 473.82, respectively, all of which are in close agreement with the theoretical values. Substitution of an equivalent amount of $(C_4H_9)_2N(C_3N_3)Cl_2$ in the foregoing procedure for the cyanuric chloride, yields the corresponding triazine monomer.

$(C_4H_9)_2N(C_3N_3)(NHC_6H_4CH_2CH=CH_2)_2$

Ultimate analyses and molecular weight determination give 73.84% carbon; 8.0% hydrogen; 17.69% nitrogen; and a molecular weight of 471.2, all of which values check closely with the theoretical values.

By using equivalent quantities of ortho-vinyl phenol instead of the amine compounds in the foregoing procedures, there is obtained $(C_3N_3)(OC_6H_4CH=CH_2)_3$, which gives on analyses 74.3% carbon; 4.79% hydrogen; 9.59% nitrogen; and a molecular weight of 433.9; all of which values are in close agreement with the theoretical values; and $(C_4H_9)_2N(C_3N_3)(OC_6H_4CH=CH_2)_2$, which gives values on analyses of 72.87% carbon; 7.1% hydrogen; 12.59% nitrogen; and a molecular weight of 442.7; all of which values are in close agreement with the theoretical values.

By these procedures, the various triazine monomers used hereinafter in the examples are prepared. These have the following structures:

Triazine monomer I $\quad (C_3N_3)(OC_6H_4CH=CH_2)_3$

Triazine monomer II $\quad (C_3N_3)(OC_6H_4CH_2CH=CH_2)_3$

Triazine monomer III $\quad (C_3N_3)(OC_6H_4CH_2CH=CH_2)_3$

Triazine monomer IV $\quad (C_3N_3)(NHC_6H_4CH_2CH=CH_2)_3$

Triazine monomer V $\quad CH_3O-(C_3N_3)(OC_6H_4CH_2CH=CH_2)_2$

Triazine monomer VI $\quad (C_4H_9)_2N-(C_3N_3)(OC_6H_4CH=CH_2)_2$

Triazine monomer VII $\qquad\qquad\qquad\quad O$
$\qquad\qquad\qquad\quad ||$
$(C_2H_5O)_2P-(C_3N_3)(OC_6H_4C_6H_4CH_2CH=CH_2)_2$ Triazine monomer VIII $\quad ClC_6H_4NH-(C_3N_3)(OC_{10}H_6CH_2CH=CH_2)_2$ Triazine monomer IX $\qquad\qquad\qquad\qquad\qquad\qquad\qquad CH_3$
$\qquad\qquad\qquad\qquad\qquad\qquad\qquad |$
$CH_2=CHCH_2OOCCH_2O-(C_3N_3)(OC_6H_4C=CH_2)_2$ Triazine monomer X $\quad CH_2=CH-CH_2-O-(C_3N_3)(OC_6H_4CH_2CH=CH_2)_2$ Triazine monomer XI $CH_3CONHCH_2CH_2O—(C_3N_3)(OCH_2C_6H_4CH=CH_2)_2$ Triazine monomer XII $CH=CHCH_2O—(C_3N_3)(OCH_2CH_2OC_6H_4CH=CH_2)_2$ Triazine monomer XIII $(CH_3NH)_2(C_3N_3)(OC_6H_4CH=CH_2)$

EXAMPLE II

| | Parts |
|---|---|
| Alkyd resin B | 80 |
| Triazine monomer I | 20 |
| Benzoyl peroxide | 1 |

The alkyd resin B, the triazinyl monomer, and the benzoyl peroxide are thoroughly and uniformly mixed at room temperature. The mixture is then subjected to heat, specifically a temperature of 85° to 90° C. In 15 to 30 minutes the mixture is converted into an insoluble, infusible, extremely hard product. After 15 hours heating, the resinous mass is only slightly harder than after one hour's heating. When the same mixture is heated to 130–150° C., it is converted to an insoluble, infusible mass in less than 60 seconds, usually between 30 and 45 seconds.

Fillers such as alpha cellulose, shredded cellulose derivatives, wood flour, asbestos, paper, cloth, etc., can be impregnated with the mixed unpolymerized or partially copolymerized components and the mass hardened under heat or under heat and pressure to yield molded articles of good appearance and excellent physical properties, and improved heat resistance.

To improve the heat resistance further, the foregoing procedure is repeated using a higher ratio of the triazine monomer to the unsaturated alkyd resin, as follows:

| | Parts |
|---|---|
| Alkyd resin B | 50 |
| Triazine monomer I | 50 |
| Benzoyl peroxide | 1 | and

| | Parts |
|---|---|
| Alkyd resin B | 75 |
| Triazine monomer I | 25 |
| Benzoyl peroxide | 1 |

The compositions of this example can be used as low temperature, low pressure laminating resins for the preparation of reinforced laminates from glass mat or fabric by using, instead of benzoyl peroxide, methyl ethyl ketone hydroperoxide and a room temperature activator such as cobalt acetate according to procedures well known in the art. Other catalysts that can be used in the products of this and the subsequent examples are: acetyl peroxide, diisopropyl benzene hydroperoxide, tertiary butyl hydroperoxide, t-butyl peracetate, t-butyl perbenzoate cumenehydroperoxide, cyclohexanone peroxide, di-tert-butyl peroxide, hydroxyheptyl peroxide, lauryl peroxide, permaleic acid, succinyl peroxide, dicumyl peroxide, dichlorobenzoyl peroxide, etc., and as accelerators may be used, benzene sulfinic acid, diethyl aniline, dimethyl p-toluidine, dimethyl o-toluidine, beta-hydroxyethyl aniline, phenyldiethanolamine, tri-n-hexylamine, dodecyl mercaptan, etc.

It will be understood, of course, that this invention is not limited to the interpolymerization product of alkyd resin B, i.e., ethylene glycol maleate, and triazine monomer I given in the above illustrative example, and that any other triazine monomer of this invention can be used, e.g., triazine monomer II, triazine monomer III, triazine monomer IV, triazine monomer V, triazine monomer VI, triazine monomer VII, triazine monomer VIII, triazine monomer IX, triazine monomer X, triazine monomer XI, and triazine monomer XII.

Likewise instead of using ethylene glycol maleate, any other modified or unmodified unsaturated alkyd resin can be used, for example, alkyd resin A, alkyd resin B, alkyd resin C, alkyd resin D, alkyd resin E, alkyd resin F, alkyd resin G, alkyd resin H, alkyd resin I, alkyd resin J, etc.

Then the procedure of Example II is repeated using the following respective mixtures with one part of benzoyl peroxide:

| Alkyd resin | Parts | Triazine monomer | Parts |
|---|---|---|---|
| A | 75 | II | 25 |
| A | 50 | IV | 50 |
| A | 10 | V | 90 |
| B | 22 | I | 78 |
| B | 35 | III | 65 |
| B | 42 | VIII | 58 |
| C | 55 | X | 45 |
| C | 65 | IX | 35 |
| C | 77 | XII | 23 |
| D | 82 | VI | 18 |
| D | 90 | VII | 10 |
| D | 92 | XI | 8 |
| E | 99 | I | 1 |
| E | 97 | IV | 3 |
| E | 50 | II | 50 |
| E | 50 | VI | 50 |
| F | 40 | V | 60 |
| F | 60 | VIII | 40 |
| G | 70 | I | 30 |
| G | 75 | VI | 25 |
| G | 52 | II | 48 |
| G | 78 | VII | 22 |
| G | 37 | XII | 63 |
| H | 5 | V | 95 |
| H | 25 | II | 75 |
| H | 15 | VIII | 85 |
| H | 85 | III | 15 |
| H | 70 | IX | 30 |
| H | 73 | IV | 27 |
| I | 55 | X | 45 |
| I | 46 | VII | 54 |
| I | 12 | III | 88 |
| I | 81 | XII | 19 |
| J | 55 | V | 45 |
| J | 45 | XI | 55 |

In each case the copolymerization produces an insoluble, infusible, heat resistant interpolymer.

Instead of copolymerizing a single triazinyl vinyl monomer and one unsaturated alkyd resin, a plurality of such triazinyl monomers can be polymerized with a single unsaturated alkyd resin, or with a plurality of such resins. In this way, it is possible to obtain a composition comprising a mixture of interpolymers best adapted to meet a particular service application. The interpolymers of at least one triazinyl monomer and at least one unsaturated alkyd resin can be modified further by the addition of other vinyl monomers, such as the acrylates, methacrylates, styrene, the vinyl esters, the allyl esters, etc., as hereinbefore mentioned.

The respective mixtures indicated in the table below are reacted after one part of benzoyl peroxide is added by first dissolving it in the additional monomer, and the reaction mass heated to 100° C. for 5 hours.

| Alkyd resin | Parts | Triazine monomer | Parts | Other monomer | Parts |
|---|---|---|---|---|---|
| B | 50 | I | 10 | Styrene | 40 |
| B | 40 | I | 30 | Divenyl benzene | 30 |
| B | 50 | II | 20 | Vinyl acetate | 30 |
| B | 50 | III | 25 | Methyl methacrylate | 25 |
| B | 60 | VI | 15 | Acrylonitrile | 25 |
| B | 60 | VII | 10 | Divinyl benzene | 30 |
| A | 50 | IX | 25 | Diallyl phthalate | 25 |
| A | 50 | XI | 25 | Allyl methacrylate | 25 |
| A | 50 | VII | 30 | Ethyl acrylate | 20 |
| A | 50 | IV | 20 | Allyl acetate | 30 |
| A | 60 | VIII | 20 | Dimethyl itaconate | 20 |
| A | 60 | V | 20 | Diallyl maleate | 20 |
| A | 60 | X | 20 | Triallyl cyanurate | 20 |
| A | 60 | I | 20 | Triazine monomer II | 20 |

The resulting interpolymers are hard, and insoluble and infusible.

EXAMPLE III

This example illustrates the use of the triazinyl monomers in the preparation of copolymers with other monomers containing ethylene groups, i.e., $CH_2=C<$, $CH_2=CH$, $-CH=CH-$, etc., such as, for example, vinyl acetate, ethyl acrylate, methyl methacrylate, styrene, etc. Thus, one part of monomer I and nineteen parts of ethyl methacrylate and 0.2 part of benzoyl peroxide are mixed together and heated at 60° C. A tough, hard, insoluble, infusible copolymer is produced.

As little as one part of triazinyl monomer to 99 parts of the additional monomer, or 99 parts of the triazinyl monomer to one part of the additional monomer can be used. Moreover, instead of using the specific triazinyl monomer in the foregoing procedure, any other triazinyl monomer of this invention, or a mixture of such monomers with a single additional monomer or mixture of monomers, can be used. The mixtures in the following table are individually heated as above to give copolymers.

| Triazine monomer | Parts | Other monomer | Parts |
|---|---|---|---|
| I | 10 | Methyl methacrylate | 90 |
| II | 5 | Vinyl acetate | 95 |
| III | 7 | Diallyl phthalate | 93 |
| V | 5 | Styrene | 95 |
| VI | 20 | Styrene and Divinyl benzene | 40 40 |
| VII | 50 | Acrylonitrile and Ethyl acrylate | 10 40 |
| VIII | 20 | Dimethyl itaconate and Ethyl methacrylate | 20 60 |
| IX | 75 | Diethyl maleate | 25 |
| X | 30 | Styrene and Maleic anhydride | 40 30 |

The copolymer mixtures of the above table in which the functionality of the monomer mixture exceeds two, yield insoluble, infusible, heat-resistant copolymers.

Five parts of monomer I and 95 parts of polyethylene (mol. wt. 30,000, density 0.94) are milled together to uniformity and irradiated with a 7 mev. linear electron accelerator and given a dosage of 50 megareps. An insoluble, infusible, polyethylene which has grafted triazine monomer is obtained having a higher heat resistance than an unmodified irradiated polyethylene. In place of the polyethylene, other polymers are used, namely natural or synthetic rubbers, polystyrene, polyvinyl acetate, nylon, ethylene glycol terphthalate, etc. to give corresponding grafted products.

EXAMPLE IV

A laminated product using the resin of Example II, which contains equal parts of alkyd resin B and triazine monomer I, is prepared using 50 parts by weight of woven glass fabric and 50 parts of resin, and cured at 100° C. for 15 minutes, and post-cured at 150° C. for two hours. Similar products are prepared using in one case, styrene in place of the triazine monomer, and, in another case, triallyl cyanurate as the monomer. The product using the triazine monomer has less flammability, high heat resistance, and higher solvent resistance than the corresponding product in which the triazine monomers of this invention are omitted.

EXAMPLE V

A molding composition is prepared using 70 parts of ground fibrous asbestos and 30 parts of the resin of Example II, containing 40 parts alkyd resin B, 30 parts of triazine monomer I, and 30 parts of divinyl benzene, and molded at 125° C. at 800 pounds sq. in. for four minutes, to produce a hard, heat-resistant molding. This compound is especially suited for use in electrical apparatus, such as heat-resistant electrical connectors, switch handles, electric toaster handles and controls, missile components, noses and guide fins, etc.

EXAMPLE VI

One hundred parts of the monomer prepared in Example I is slowly added over a period of less than an hour to 1000 parts of distilled water at 30–50° C. containing dissolved therein one part of ammonium persulfate, one part of sodium bisulfite and 0.5 part of sodium dodecylbenzene sulfonate. The reaction is continued for six hours, at which time a yield of about 90 percent solid polymer is precipitated. The resulting polymer has excellent resistance to heat, light, and solvents. Other monomers of this invention are similarly polymerized.

EXAMPLE VII

Five copolymers of acrylonitrile are prepared from the following monomer compositions containing as the triazinyl monomer that identified hereinbefore as triazine monomer XIII.

| Polymer | Acrylonitrile, parts | Triazine monomer, parts |
|---|---|---|
| A | 100 | 0.0 |
| B | 99.9 | 0.1 |
| C | 95.0 | 5.0 |
| D | 90 | 10.0 |
| E | 80 | 20.0 |

The 100 parts of monomer or monomer mixture is, in each case, slowly added over a period of less than an hour to 1,000 parts of distilled water at 50° C. containing dissolved therein one part of ammonium persulfate, one part of sodium bisulfate, and 2 parts of sodium dodecylbenzene sulfonate. The reaction is continued for 12 hours, at which time a yield of about 92 percent solid polymer is precipitated. The resulting polymers have molecular weights over 10,000. Each polymer is dissolved in N,N-dimethyl acetamide and a film cast from each solution.

A water solution of methylene blue dye (a basic dye) is prepared by making a paste of the dye and then diluting to a 1 percent by weight dye solution. This solution is kept boiling for one hour while the aforementioned films are immersed therein for one hour. The dyed films are then removed, separated, and subjected to washing with boiling water for one hour, the boiling water being changed frequently to remove the desorbed dye. The unmodified polyacrylonitrile film shows only a light tint, whereas the copolymer films are colored a dense and deep shade. Identical films, cold-drawn and heat-treated, show dyeing characteristics similar to undrawn films.

Films are spun from the same N,N-dimethyl acetamide solutions both by dry spinning and by wet spinning into glycerine baths. The fibers are substantially free from solvent and dried. After cold-drawing the dried fibers 600–900 percent at 120–145° C. and subsequently heat-treating them at 150° C. for one hour, the fibers are given the same dyeing and washing treatment described above with the same results as for the films, a light tint being acquired by the unmodified polyacrylonitrile fibers and a deep and dense color being acquired by the copolymer fibers.

The invention claimed is:

1. A composition of matter comprising a copolymerization product of a polymerizable mass comprising at least one unsaturated alkyd resin and at least one monomer of the structure:

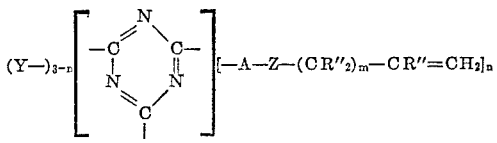

wherein $n$ is an integer having a value of at least 1 and not more than 3, Z is a divalent radical selected from the class consisting of divalent aromatic hydrocarbon radicals having no more than 12 carbon atoms therein, A is a divalent radical selected from the class consisting of —O— and —NR'— radicals, R' is a radical selected from the class consisting of hydrogen and hydrocarbon radicals having no more than 12 carbon atoms therein, Y represents a monovalent radical, R'' is a radical selected from the class consisting of hydrogen, halogen, and hydrocarbon radicals having no more than 6 carbon atoms therein, and $m$ is selected from the class consisting of 0 and 1, said unsaturated alkyd resin being an esterification product of a polyhydric alcohol and an alpha,beta-unsaturated aliphatic polycarboxylic acid.

2. A composition of claim 1, in which the polymerizable mass comprises 2,4,6-tri-[p(allyl-phenyl)amino]-1,3,5-triazine and said alkyd resin.

3. A composition of claim 1, in which the polymerizable mass comprises 2,4,6-tri-[(vinylphenyl)amino]-1,3,5-triazine and said alkyd resin.

4. A composition of claim 1, in which said copolymerization product is a polymerization product in which said polymerizable mass comprises at least one other copolymerizable monomer having an ethylenically-unsaturated aliphatic group therein.

5. A composition of claim 4, in which said copolymerizable monomer has a group of the formula $CH_2=C<$ therein.

6. A composition of claim 5, in which said copolymerizable monomer is styrene.

7. A composition of claim 5, in which said copolymerizable monomer is acrylonitrile.

8. A composition of claim 5, in which said copolymerizable monomer is ethyl methacrylate.

References Cited in the file of this patent

UNITED STATES PATENTS

| | | |
|---|---|---|
| 2,361,823 | D'Alelio et al. | Oct. 31, 1944 |
| 2,643,990 | Ham | June 30, 1953 |
| 2,694,687 | Benneville et al. | Nov. 16, 1954 |
| 2,744,943 | Luskin et al. | May 8, 1956 |
| 2,868,788 | Luvisi | Jan. 13, 1959 |